Oct. 17, 1939.  E. A. BRUNELLE  2,176,701
COOKING MACHINE
Filed Feb. 14, 1938  4 Sheets-Sheet 1

Inventor:
Eugene A. Brunelle,
Attys.

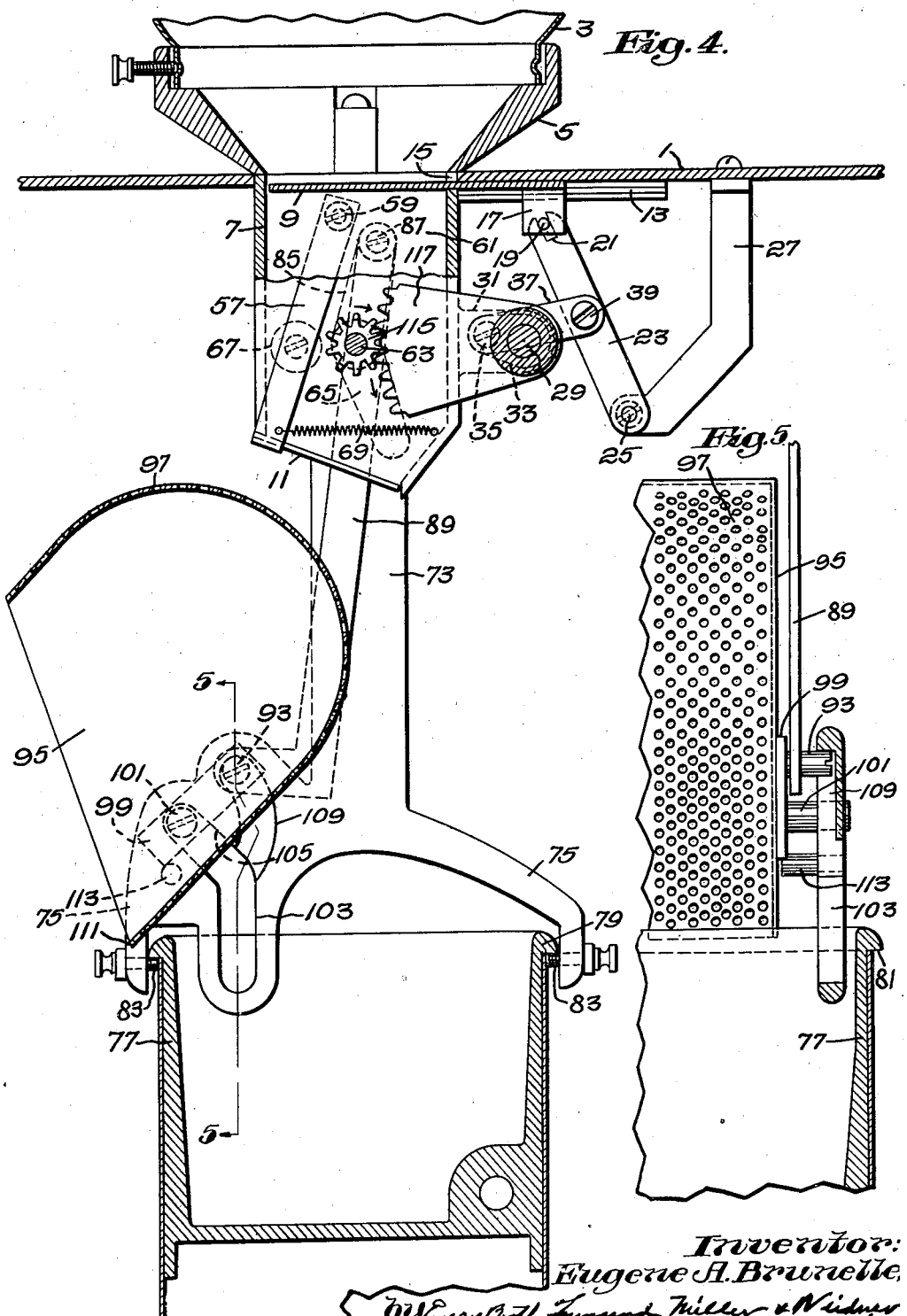

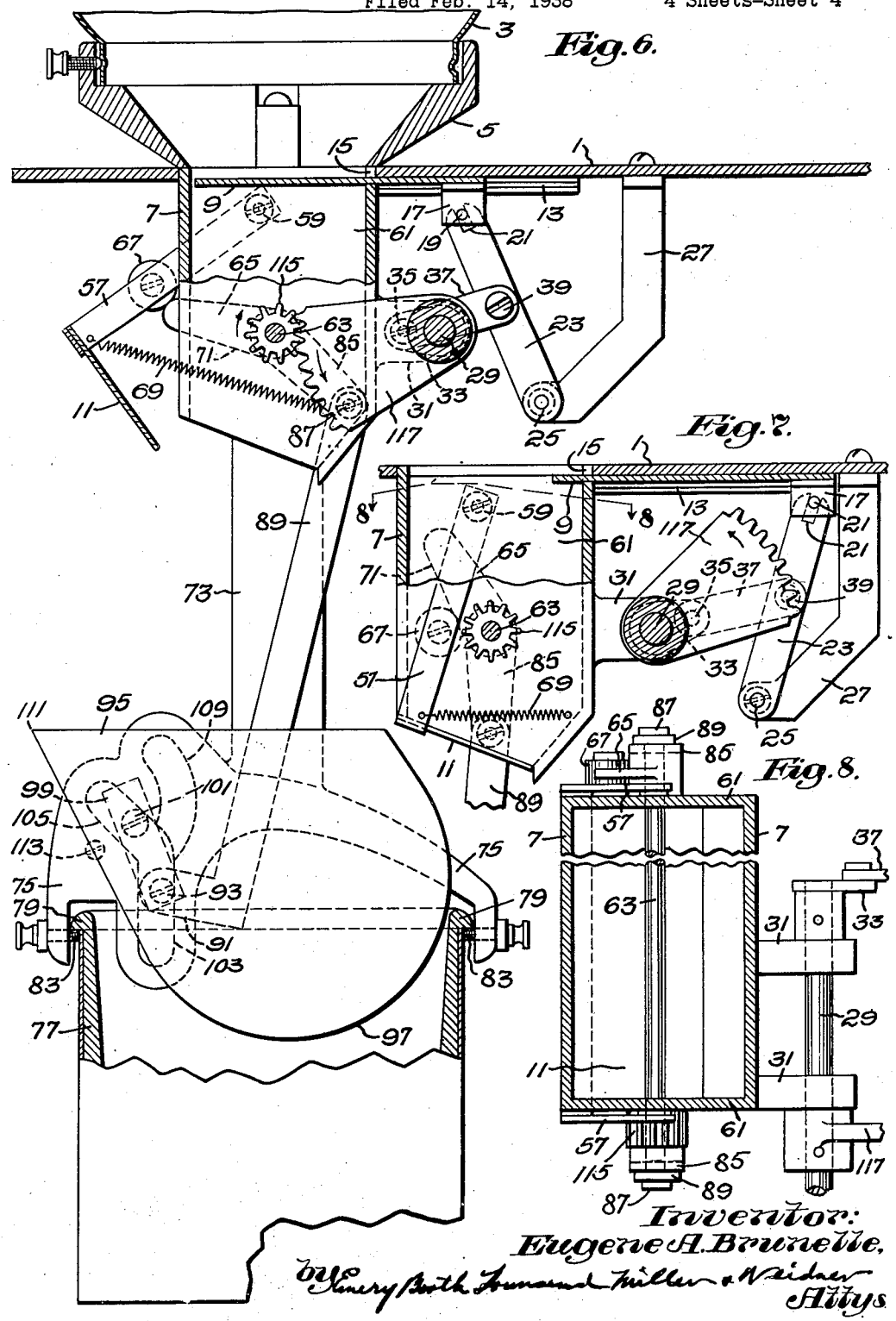

Patented Oct. 17, 1939

2,176,701

UNITED STATES PATENT OFFICE 2,176,701

COOKING MACHINE

Eugene A. Brunelle, Somersworth, N. H.

Application February 14, 1938, Serial No. 190,361

16 Claims. (Cl. 53—7)

My invention relates to machines for cooking articles as, for example, frying nuts, the present machine being an improvement in that of my prior Patent 2,004,500, issued June 11, 1935.

The invention has among its objects the provision of simplified mechanism which will automatically place successive batches of nuts in hot cooking fat and discharge them therefrom when fried, and will be best understood from the following description when read in the light of the accompanying drawings, the scope of the invention being more particularly pointed out in the appended claims.

In the drawings—

Fig. 4 is an elevation of the machine according to Figs. 1, 2 and 3, with parts in section and in a different operative position;

Fig. 5 is a section on the line 5—5 of Fig. 4;

Fig. 6 is an elevation according to Fig. 4, with parts in a still different operative position;

Fig. 7 is a fragment of the machine according to Fig. 6, with parts in a still different operative position; and Fig. 8 is a section on the line 8—8 of Fig. 7.

Figures 1, 2:
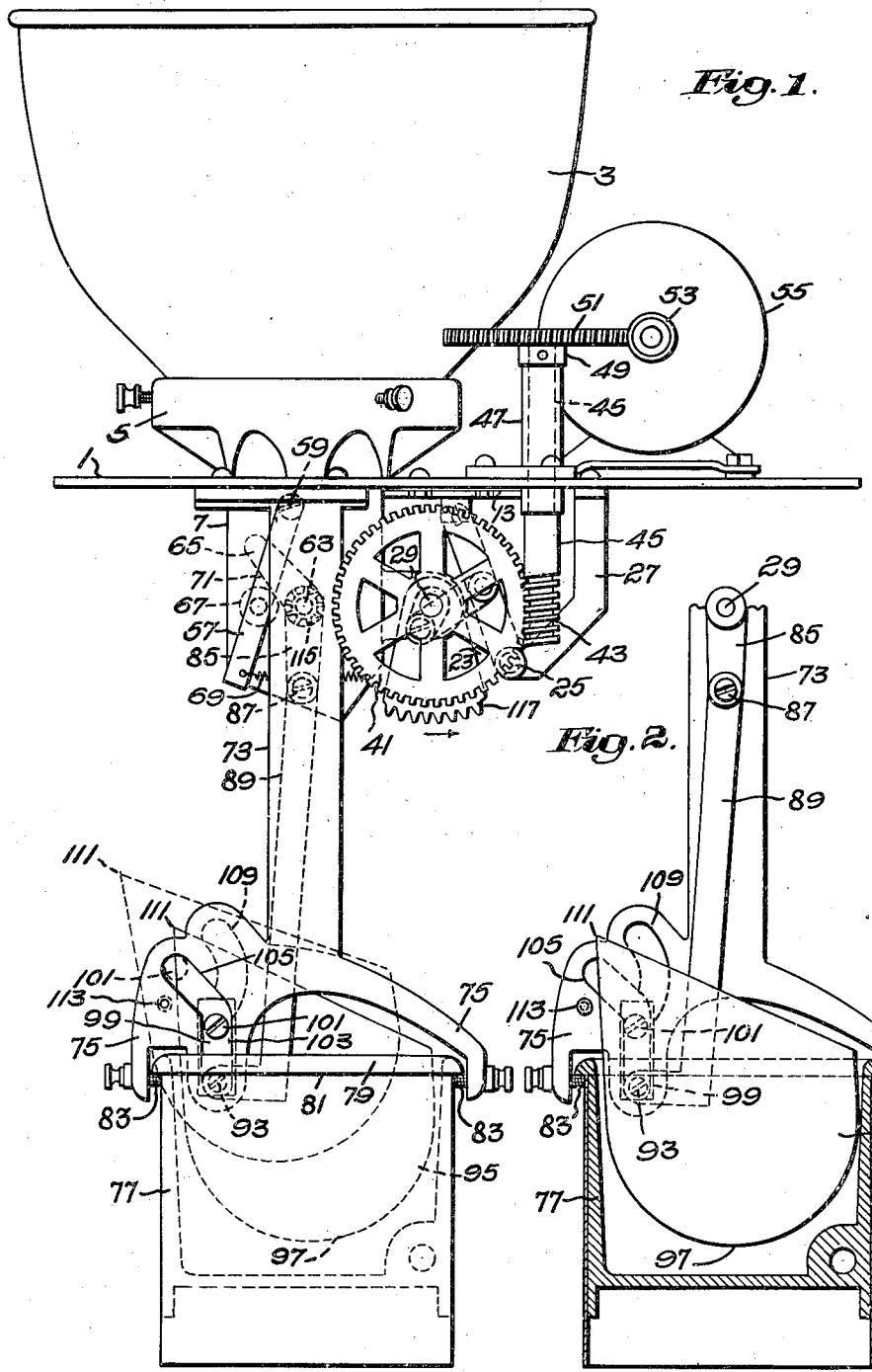
Figure 1 is a side elevation of a fragment of the machine.
Fig. 2 is a side elevation of the lower portion of the machine according to Fig. 1, with parts in section.

Referring to the drawings, the machine comprises a support 1 which may be, for example, a top wall of a cabinet. The remaining parts of the machine are carried by this support.

As shown, above the support is a hopper or other receptacle for the nuts or other articles to be cooked. The body 3 of this receptacle, which may be of glass, is carried in any suitable manner by a base portion 5 directly carried by the support 1.

Herein, extending downwardly from the base portion 5 of the nut receptacle, and integral therewith, is a casing or chute 7 having a top opening which is opened and closed by a sliding plate-like valve 9 and a bottom opening which is opened and closed by a swinging plate-like valve 11. By opening the valve 9 when the valve 11 is in closed position, and closing the valve 9 when the casing 7 is filled with nuts, which flow into the casing from the receptacle 3 while the valve 9 is in open position, and then opening the valve 11 while the valve 9 is in closed position, measured quantities of nuts may be discharged from the receptacle into the vessel in which the articles are to be cooked.

Figure 3:
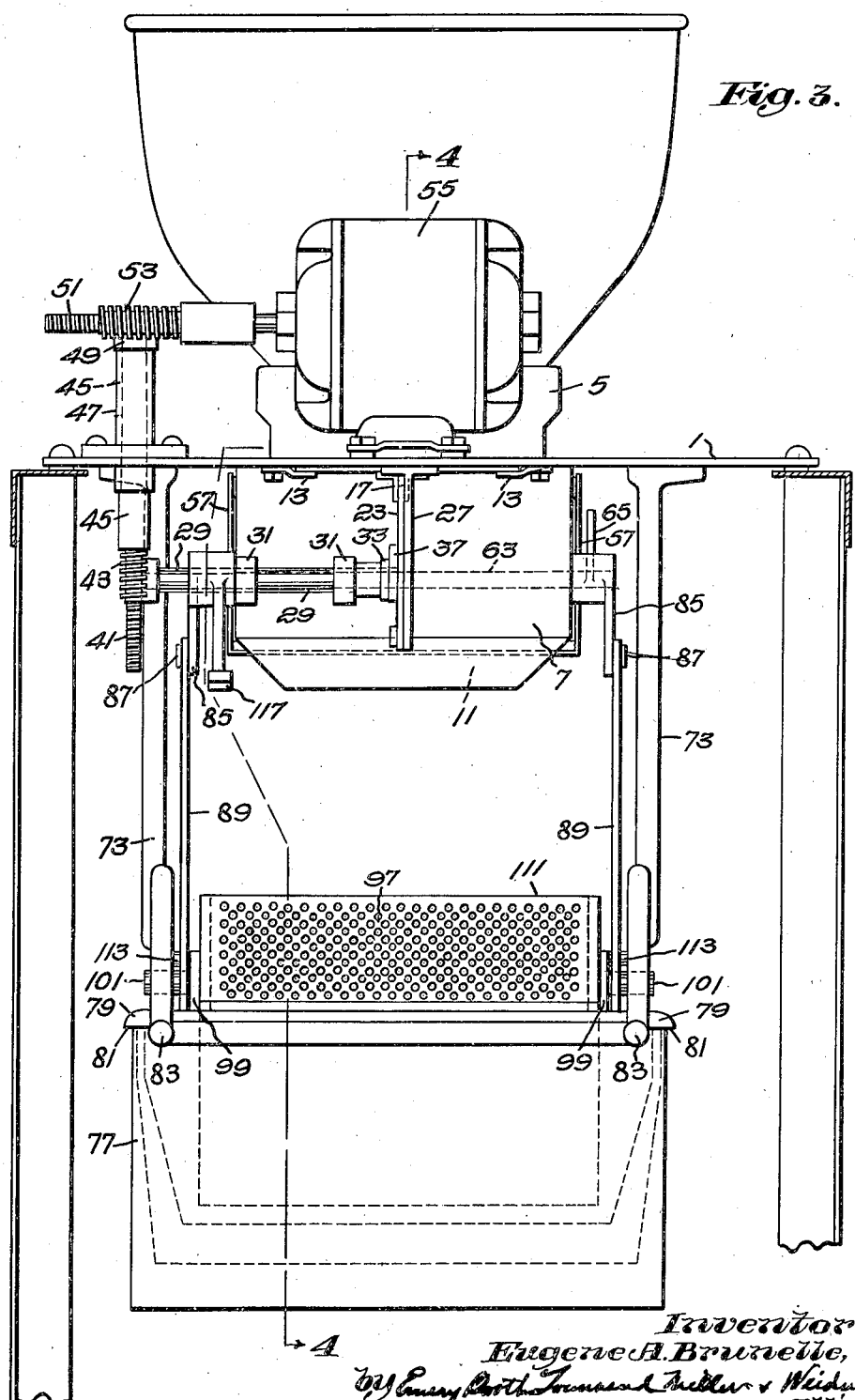
Fig. 3 is a side elevation of the machine according to Fig. 1 looking at the latter from the right.

In the present embodiment of the invention the valve 9, which is mounted for sliding in suitable guideways 13, extends through an opening 15 (Figs. 4 and 6) in the wall of the casing 7, and has a downwardly projecting part 17 carrying a pin 19, which pin is received within a slot 21 at the upper end of a lever 23, the lever 23 being pivotally connected at 25, adjacent its lower end, to a bracket 27 rigidly carried by the support 1. The lever 23 is swung, by a rotary shaft 29, about its pivotal connection 25 for sliding the valve 9 into open and closed positions. The shaft 29, as shown, is journaled near adjacent ends thereof in lugs 31 (Figs. 3 and 8) formed integrally with the casing 7. This shaft carries a crank 33, to the crank pin 35 of which is pivotally connected one end of a link 37, the other end of the link being pivotally connected at 39 to an intermediate portion of the swinging lever 23. It will thus be observed that as the shaft 29 is rotated the valve 9 will be alternately opened and closed.

For rotating the shaft 29 the same carries at one end thereof a worm wheel 41 with which meshes a worm 43 at the end of a vertical shaft 45 rotatably supported in a bearing sleeve 47 carried by the support 1. Secured to the upper end of the shaft 45 is a hub 49 (Fig. 1) of a worm wheel 51 which meshes with a worm 53, the latter in the present embodiment of the invention being driven continuously, when the machine is in operation, by an electric motor 55. The two worm drives just described being in series afford considerable gear reduction, so that the shaft 29 is rotated relatively slowly as compared with the speed of the motor 55.

The swinging plate-like valve 11 at the lower end of the casing 7 is rigidly carried at opposite ends of one of its edges by arms 57, these arms at their ends opposite the valve being each pivotally connected at 59 to the adjacent end wall 61 of the casing 7.

Extending through the casing 7, and rotatably supported by the end walls 61 thereof, is a shaft 63 which, by means hereinafter described, is intermittently rotated through one revolution. One of the projecting ends of this shaft carries an arm 65 adapted, when the shaft 63 is rotated, to wipe against a contact roller 67 carried by one of the arms 57, so as to move the valve 11 from its closed position shown by Fig. 7 to its open position shown by Fig. 6. When the arm 65, which rotates clockwise as viewed in Figs. 6 and 7, moves from its position shown by Fig. 6 out of contact with the roller 67 the tension spring 69, connected at one end to one of the arms 57 and at its opposite end to the casing 7, will cause the valve almost instantly to close as the roller 67 rides down the side 71 (Fig. 7) of the arm 65.

Carried by and depending from the support 1 is a pair of arms 73 which at their lower ends are, as illustrated, formed with fingers 75 supporting a container 77 for the hot fat or other cooking liquid. This receptacle is formed preferably of metal of good heat conducting quality such as aluminum, and the contents thereof are maintained at requisite frying temperature in any convenient manner, say by a heating resistance unit (not shown) carried by and in contact with the bottom wall of the container at the under side thereof.

As shown, the container 77 about its upper edge at the exterior thereof is formed with a bead 79 providing an exterior peripheral shoulder 81 (Fig. 1). Coacting with this shoulder for removably securing the container to the fingers 75 are readily removable screws 83 carried by the fingers, on which screws the bead 79 rests.

In the present embodiment of the invention the shaft 63 at its opposite ends carries crank arms 85, to the crank pins 87 of which are pivotally secured the upper ends of links 89. Each of these links at its lower end has an offset portion 91 which at its outer end is pivotally connected to a pin 93 projecting from the imperforate end wall 95 of an open top basket for the nuts being cooked, the side and bottom walls 97 of which basket are foraminous. As clearly illustrated in the drawings, the lower end of each link 89 lies in the narrow space between the adjacent arm 73 and end wall 95 of the basket.

As illustrated, the pins 93, through which the links 89 are pivotally connected to the basket, are each carried by a block 99 (Figs. 1 and 5) secured to the adjacent end wall of the basket, these blocks each also carrying a longer pin 101. The lower portion of each arm 73 is formed with a through slot 103 having the inclined portion 105 projecting toward the adjacent edge of the fat container 77. From an intermediate portion of the slot 103 extends a shallow curvilinear slot 109. The pin 93 extends into these slots, but the pin 101 is of such length that it can be received only in the slot 103 and its inclined portion 105.

As the result of the above described construction, when the shaft 63 is rotated through approximately 180°, starting with the crank arms 85 in their positions shown by Fig. 1, the links 89 which support the basket will be raised to move the basket from its full line position shown by Figs. 1 and 2 to its position shown by Fig. 4. During the upward movement of the basket the pins 101 will enter the inclined portions 105 of the through slots in the arms 73, so that when the basket has been raised sufficiently to bring the pins 101 into their dotted line position shown by Fig. 1 the edge 111 of the basket will have been moved laterally sufficiently to position that edge outside the plane of the adjacent edge of the fat container 77. Continued upward movement of the basket from its dotted line position shown by Fig. 1 will cause it to be tilted or swung into its position shown by Fig. 4 due to the fact that the pin 101 during this continued movement is at the closed end of the inclined portion 105 of the through slot and thus acts as a pivot about which the basket may swing. During this tilting motion the pin 93 moves into the shallow slot 109, and by coacting with the walls thereof the links 89 are prevented from swinging, other than is caused by movement of the crank arms 85, about their pivotal connections to said crank arms, which swinging, if it occurred, would cause the edge 111 of the basket to move inwardly of the plane of the adjacent edge of the fat container. So as to prevent the portion of the side walls of the basket adjacent its edge 111 from striking the adjacent edge of the fat container while the nuts are being dumped therefrom the lower portion of each arm 73 carries an inwardly projecting pin 113 adapted to act as a stop for limiting the swinging of the basket toward the fat container about the axis of the pins 93 when the parts are in their positions shown by Fig. 4 and in positions adjacent thereto.

For rotating the shaft 63 the same at one end thereof, as illustrated, is provided with a pinion 115, while adapted to mesh with this pinion is a gear segment 117 carried by and rotating with the shaft 29.

It will be observed that when the parts are in the position shown by Fig. 1 the gear segment 117 is out of contact with the pinion 115, and consequently the basket remains stationary in the fat to permit the nuts to be cooked. Continued rotation of the shaft 29 will open the valve 9 when the gear segment is in its position shown by Fig. 7, and close the valve when it is in its position shown by Fig. 4, the valve remaining closed due to the passage of the crank pin 35 over its dead center position illustrated by Fig. 6 while the valve 11 is being opened by movement of the crank arm 65 from its position shown by Fig. 4 to its position shown by Fig. 6.

The gear segment 117, by meshing with the pinion 115, rotates the shaft 63 through one revolution during the first 180° of which the basket is moved from its position shown by Fig. 1 to its dumping position shown by Fig. 4, as above explained.

During the remaining 180° revolution of the shaft 63 the basket is lowered into its position shown by Fig. 1. During this movement when the basket is lowered part way to bring it into its position shown by Fig. 6 the valve 11 is opened, as above explained, to cause a batch of nuts or the like to fall into the basket, this preferably being done before the bottom of the container is in the fat so as not to splash the latter. As the basket during the operation of lowering it moves out of its position shown by Fig. 6 the gear segment moves out of mesh with the pinion 115, and the weight of the basket causes it immediately to descend and move the arm 65 into its position shown by Fig. 7 so as to cause the valve 11 immediately to close.

It will be observed that the basket in the present embodiment of the invention is raised from its lowermost position to its uppermost position by successive movements, one of which raises it bodily from its lowermost position to an intermediate position and the next of which swings it about a pivot to raise it from that intermediate position to its uppermost position, and that it is lowered from its uppermost position to its lowermost position by the reverse of these movements. By such an operation the basket may be more readily shaped to fill a greater proportion of the space in the fat container than were the basket raised and lowered entirely by swinging it about a pivot. On the other hand, were the basket raised and lowered entirely by moving it bodily without swinging it to dump its contents additional means would have to be provided for removing the fried nuts when the basket is in raised position, which although entirely feasible nevertheless involves the use of a more complicated mechanism than now provided. It will thus be understood that in the appended claims by "raising and lowering" the basket, or by words of like import, unless otherwise specified is included raising and lowering the basket by these two successive movements or entirely by either of them.

It will be understood that within the scope of the appended claims wide deviations may be made from the embodiment of the invention herein described without departing from the spirit of the invention.

I claim:

1. A machine of the character described having, in combination, a container for hot cooking liquid, a basket for the articles to be cooked, basket-moving-means for raising and lowering said basket relative to said container comprising a rotary operating shaft, and means for intermittently rotating said shaft for causing said basket-moving-means to operate intermittently through its cycle of movement which causes said basket to be raised from and lowered into said container.

2. A machine of the character described having, in combination, a container for hot cooking liquid, a basket for the articles to be cooked, a rotary shaft, basket-operating-means driven by said shaft effective to raise said basket from and lower it into said container during one revolution of said shaft, and means for intermittently rotating said shaft through one revolution.

3. A machine of the character described having, in combination, a container for hot cooking liquid, a basket for the articles to be cooked, basket-moving-means for raising and lowering said basket relative to said container comprising a rotary operating shaft, and means for intermittently rotating said shaft for causing said basket-moving-means to operate intermittently through its cycle of movement which causes said basket to be raised from and lowered into said container; said means for rotating said shaft comprising a pinion on said shaft and a rotating gear segment adapted to mesh intermittently with said pinion.

4. A machine of the character described having, in combination, a container for hot cooking liquid, a basket for the articles to be cooked; means for raising and lowering said basket relative to said container comprising a rotary shaft, a crank arm, and a link pivotally connected at opposite end portions to said crank arm and basket; and means for intermittently rotating said shaft through one revolution, whereby to raise said basket from and lower it into said container and then permit it to remain in said container until said shaft is again rotated.

5. A machine of the character described having, in combination, a container for hot cooking liquid, a basket for the articles to be cooked; means for raising and lowering said basket relative to said container comprising a rotary shaft, a crank arm, and a link pivotally connected at opposite end portions to said crank arm and basket; and means for intermittently rotating said shaft through one revolution, whereby to raise said basket from and lower it into said container and then permit it to remain in said container until said shaft is again rotated; said means for rotating said shaft comprising a pinion on said shaft and a rotating gear segment adapted to mesh intermittently with said pinion.

6. A device of the character described having, in combination, a container for hot cooking liquid, a basket for the articles to be cooked, means comprising a rotary shaft for raising and lowering said basket, means for intermittently rotating said shaft for intermittently raising and lowering said basket, a receptacle for the articles to be cooked, a discharge device for said receptacle for entering articles into said basket, and means operated by said rotary shaft for operating said discharge device for causing articles to be entered into said basket when the latter is in raised position relative to said container.

7. A device of the character described having, in combination, a container for hot cooking liquid, a basket for the articles to be cooked, means comprising a rotary shaft for raising and lowering said basket, means for intermittently rotating said shaft for intermittently raising and lowering said basket, means comprising a downwardly directed chute for discharging articles into said basket, a swinging valve for the end of said chute, and means rotating with said shaft for operating said valve to open it when said basket is in raised position relative to said container.

8. A device of the character described having, in combination, a container for hot cooking liquid, a basket for the articles to be cooked, means comprising a rotary shaft for raising and lowering said basket, means comprising a downwardly directed chute for discharging articles into said basket, a valve for controlling the discharge from said chute, a pivoted swinging member carrying said valve, and a projecting part carried by said shaft for intermittently engaging said member by wiping action when said shaft is rotated for moving said member to open said valve and then release said member to cause said valve to close.

9. A machine of the character described having, in combination, a container for hot cooking liquid, a basket for the articles to be cooked, a receptacle for the articles to be cooked, discharge means for said receptacle comprising a movable member, a rotary shaft, means operated by said shaft for operating said discharge means, means comprising a second rotary shaft for raising and lowering said basket relative to said container, and means operated by the first mentioned shaft for intermittently rotating said second shaft.

10. A machine of the character described having, in combination, a container for hot cooking liquid, a basket for the articles to be cooked, a receptacle for the articles to be cooked, discharge means for said receptacle comprising a movable member, a rotary shaft, means operated by said shaft for operating said discharge means, means comprising a second rotary shaft for raising and lowering said basket relative to said container, and means operated by the first mentioned shaft for intermittently rotating said second shaft comprising a gear sector on the former and a pinion on the latter adapted to mesh intermittently with said sector.

11. A machine of the character described having, in combination, a container for hot cooking liquid, a basket for the articles to be cooked, a receptacle for the articles to be cooked, discharge means for said receptacle, an inlet valve and an outlet valve for said discharge means, means comprising a rotary shaft for operating one of said valves and for raising and lowering said basket relative to said container, and means comprising a second rotary shaft for operating the other of said valves and for intermittently rotating the first mentioned shaft.

12. A machine of the character described having, in combination, a container for hot cooking liquid, a basket for the articles to be cooked, a receptacle for the articles to be cooked, discharge means for said receptacle, an inlet valve and an outlet valve for said discharge means, means comprising a rotary shaft for operating one of said valves and for raising and lowering said basket relative to said container, means comprising a second rotary shaft for operating the other of said valves, and a pinion on the first mentioned shaft and a gear sector on said second shaft adapted intermittently to mesh with said pinion for causing rotating of the first mentioned shaft intermittently to rotate said second shaft.

13. A device of the character described having, in combination, a container for hot cooking liquid, a basket for the articles to be cooked, a receptacle for the articles to be cooked, a downwardly directed chute from said receptacle positioned above said container for discharging articles from said receptacle into said basket, an inlet valve and an outlet valve for said chute, a rotary shaft having an eccentric pin, a link pivotally connected at one end to said pin and at its other end to said basket whereby rotation of said shaft will raise and lower said basket relative to said container, means operated by rotation of said shaft for causing opening and closing of said outlet valve, a second shaft and means operated thereby for causing opening and closing of said inlet valve, means for continuously driving said second shaft, and means operated by said second shaft for intermittently rotating the first mentioned shaft.

14. A device of the character described having, in combination, a container for hot cooking liquid, a basket for the articles to be cooked, a receptacle for the articles to be cooked, a downwardly directed chute from said receptacle positioned above said container for discharging articles from said receptacle into said basket, an inlet valve and an outlet valve for said chute, a rotary shaft having an eccentric pin, a link pivotally connected at one end to said pin and at its other end to said basket whereby rotation of said shaft will raise and lower said basket relative to said container, means operated by rotation of said shaft for causing opening and closing of said outlet valve, a second shaft and means operated thereby for causing opening and closing of said inlet valve, means for continuously driving said second shaft, and means operated by said second shaft for intermittently rotating the first mentioned shaft, said last mentioned means comprising a pinion on the first mentioned shaft and a gear sector on said second shaft adapted intermittently to mesh with said pinion.

15. A device of the character described having, in combination, a support carrying an article receptacle, the latter having discharge means for discharging measured quantities of articles downwardly from said support, a container for hot cooking liquid operatively suspended from said support beneath said discharge means, a shaft supported by said discharge means, a basket supported by said shaft by means comprising a crank on said shaft and a link connecting said crank and basket, a second shaft, means operated by said second shaft for intermittently rotating the first mentioned shaft, and means for operating said discharge means.

16. A device of the character described having, in combination, a support carrying an article receptacle, the latter having discharge means for discharging measured quantities of articles downwardly from said support, a container for hot cooking liquid operatively suspended from said support beneath said discharge means, a shaft supported by said discharge means, a basket supported by said shaft by means comprising a crank on said shaft and a link connecting said crank and basket, a second shaft, means operated by said second shaft for intermittently rotating the first memtioned shaft comprising a pinion on the first mentioned shaft and a gear sector on said second shaft adapted intermittently to mesh with said pinion, and means for operating said discharge means.

EUGENE A. BRUNELLE.